(Model.)
A. C. BLOUNT.
STAVE AND CASK.
No. 312,955. Patented Feb. 24, 1885.
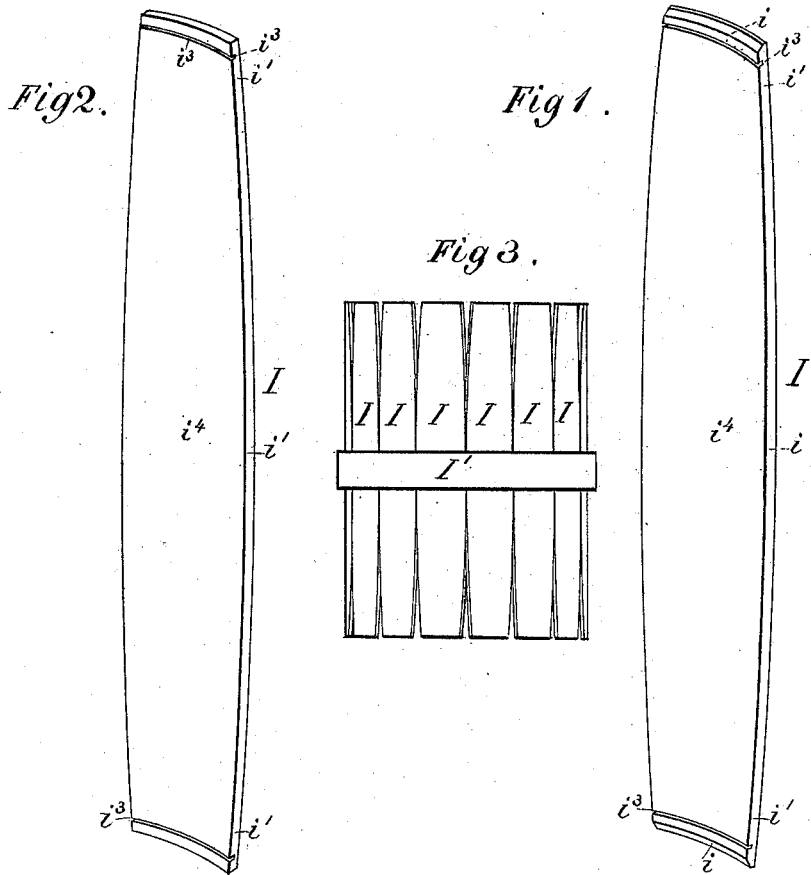
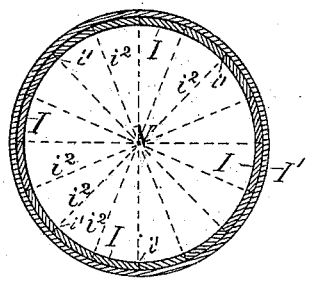
Witnesses:
Inventor:

UNITED STATES PATENT OFFICE.

ALEXANDER C. BLOUNT, OF PENSACOLA, FLORIDA.

STAVE AND CASK.

SPECIFICATION forming part of Letters Patent No. 312,955, dated February 24, 1885.

Application filed October 5, 1881. (Model.)

*To all whom it may concern:*

Be it known that I, ALEXANDER C. BLOUNT, a citizen of the United States, residing at Pensacola, Escambia county, State of Florida, have devised a new and useful invention whereby the manufacture of barrels, casks, hogsheads, and other vessels of similar character is greatly facilitated, the cost of the same greatly diminished, and a better article produced than heretofore; and I do hereby declare that the following is a full, clear, and exact description thereof, reference being had to the accompanying drawings and letters of reference thereon, in which—

Figure 1 is a perspective view of a barrel-stave completely finished and ready to be set up in connection with a number of other like staves in the act of forming a barrel. Fig. 2 is a perspective view of the barrel-stave shown in Fig. 1, but with a chamfer at each end. Fig. 3 is a nest or complement, or sufficient number of the staves, which may be without a chamfer, as shown in Fig. 1, or with a chamfer, as shown in Fig. 2, as the case may be, to constitute what is known as a barrel "cylinder" or "blank," and held in position by a central truss-hoop previous to the act of completely forming a barrel from said staves; and Fig. 4 is a central cross-section of Fig. 3.

My invention consists in machine-made staves as a new product or article of manufacture, having the construction hereinafter specifically described and claimed, so that by indiscriminately using a predetermined given number or complement thereof a tight barrel or other analogous structure of a given capacity can always be produced without any change in the construction of the staves at any point.

It also consists in barrels and other analogous structures made of such staves as a new and improved manufacture. For example, to illustrate what I mean, we will suppose that a vessel has been laden in bulk at New York with my staves and transferred to San Francisco, and that these staves—say sixteen thousand in number—are there set up into barrels, using just sixteen staves as the predetermined number for each barrel. The one thousand barrels made from such staves, without alteration of the staves, will each have the same form in all particulars and be of the same capacity, although any sixteen staves of the sixteen thousand, without reference to selection, be used to make any one of the one thousand barrels; and this, I will here state, can be effected although the staves were none of them ever before placed into position to form a barrel; and I will here further state that to form a barrel from said lot of staves, I simply take the desired number and place the same within a truss-hoop, heat or steam the form, if necessary, place a truss-hoop around the other end, insert the heads, drive the iron hoops to their desired position, remove the truss-hoops, and the barrel is complete.

In order to distinguish my invention from the state of the art as most generally practiced and enable me to contrast it therewith, I would state that staves are now prepared and barrels made therefrom as follows: The timber is riven or sawed from blocks a little longer than the staves designed to be made therefrom. If riven, the rived pieces are then roughly formed into stave shape by a bucking-machine. These riven pieces, which are of irregular width, according to the width of the block from which they are riven, are then jointed by pressing one longitudinal edge of the same against a revolving cutter, which gives the shape to the stave on one edge. The stave is then reversed, the operation repeated, and the other longitudinal edge is shaped. The staves made as above described are then placed in a truss-hoop, and, being of irregular widths, as stated, it is necessary, in forming the barrel or completing the circle of staves to form the barrel, to select a stave which will fill the last space remaining vacant in the circle. The "key" stave will be either wider or narrower than those which with it comprise the circle. The truss-hoop is then driven down to hold the staves in position, leaving the other end open and the other ends of the staves standing wide apart. The frame so formed is then steamed or heated, if necessary, and then, with the trussed end placed downward, the divergent ends of the staves are drawn or compressed together with an ordinary windlass or other suitable mechanism, and truss-hoops placed around them. In this form or condition the ends of the staves are now "dressed off" to make them level. This frame of staves is then "howeled" at those points of the staves where the "croze" is to be cut, the howeling being done for the purpose of reducing the staves to a uniform thickness at that point, so that when the croze is cut and the head inserted a tight croze-joint can be produced. The croze is now cut within the described place howeled for such purpose, whereupon the chamfer is then made on the ends of the staves. The truss-hoops are now loosened up and the head inserted, after which the truss-hoops are re-driven. The outer surface of the barrel is now made round and smooth with a curved drawing-knife or a curved plane; or it may be turned down round and smooth. The head truss-hoop is now again loosened up and "flags" inserted between the joints of the staves coming in contact with the head. The hoops are now driven on, and, the truss-hoops having been removed, the barrel is completed. From this it will be perceived that as most generally practiced in the art it is impracticable, if not impossible, to produce staves with a like width throughout their length, and inasmuch as the staves are not all of a uniform width throughout their length it is absolutely impossible with unerring certainty in every instance to form a given-sized barrel with a given or arbitrary number of such staves.

In the drawings, Figs. 1 and 2 each show one of my improved staves finished and ready for the market. The stave I shown in Fig. 1 is not made with a chamfer, while the stave I in Fig. 2 is chamferred, as shown at $i$, at each end. Both of these staves are of equal widths, they being of equal width at the bilge, of equal width at their ends and at all intermediate points between their ends. They are both equally curved on their edges from end to end, and equally beveled throughout their length on their joint edges, the curvature of said joint edges being concentric with circles whose centers are at equal distances from the center of the width of the stave, and on opposite sides of the stave, and on a line with the center of the length of the same. The thickness of these joint edges $i'$ is precisely the same throughout, and the bevel of said joint edges is made on a true radial line from the center V to the circumference of the barrel of which they are to form a part, as indicated in dotted lines at $i^2$ in Fig. 4. Said staves are equally concaved on their inner face and convexed on their outer face, so as to precisely accord with the internal and external circumferential curve of the barrel of which they are to form a part. Their inner concave and outer convex surfaces throughout are each so formed as to present a plane or straight surface longitudinally of the stave, the inner and outer surfaces being parallel. A croze, $i^3$, is formed in both, of equal width and depth, equidistant from the center or middle transverse line of the stave or a point, $i^4$, central of their length when finished, which insures the croze of a barrel made with such staves being on a perfect line in all the staves composing the barrel, and so allowing the head to be readily inserted into a groove line or croze in all the staves composing the barrel. They are not howeled out at the croze, and hence are not weakened at a point where the greatest strength is required to resist a fall or blow.

My invention in the main consists in a complement of exteriorly and interiorly planed staves for a bilged tight-joint barrel, all of the staves having the same thickness, and each having an inner transversely-concave and an outer transversely-convex surface, both of gradually-diminishing radii from the center to the ends of the stave, the surfaces being parallel and plane longitudinally, and running with the longitudinal grain of the wood, and having jointed edges beveled radially and curved lengthwise on equal radii, centered equidistant from the ends of the stave.

With staves and barrels formed under the ordinary state of the art, each barrel, for purposes of transportation and use elsewhere than at the place of manufacture, must be completely finished at the factory, and each stave of the finished barrel must be marked in such manner that when the barrel is knocked down and shooked in a separate bundle for transportation each piece will show the order in which it must be again set up. Without this it would be almost impossible to reproduce the barrel as originally made, and the loss of any one piece would necessitate the remodeling of the whole barrel. It will thus be seen that tight-joint barrels made under the ordinary condition of the art involve, first, the necessity of making up the barrel complete at the factory; second, the making of its several parts; third, the shooking of its several parts; and, fourth, the resetting up of the several parts at their point of destination, all of which labor and expense are avoided by my invention. I would state that where machine-made staves have been used it has been found necessary on account of their irregularity in width and other particulars, to injuriously crowd and mash the adjoining edge of the staves against one another in order to form tight joints in the act of making a barrel therefrom, thus breaking down the fiber of the wood at the joints, and thereby impairing the solidity and durability of the barrel, and in addition to this such staves have usually been sawed from a block across the grain of the wood in order to get the form of the stave, thus making a weaker barrel than can be made from staves rived from a block and planed in the direction of the grain of the wood on both sides of the stave, as in my case.

My staves belong to that class known as "planed" in contradistinction to sawed staves. They are manufactured in a machine from flat-rived pieces of timber. A convex cutter cuts and planes the inner segmental surface, while a concave cutter cuts and planes the outer segmental surface. The longitudinally-curved and the transversely-beveled or radial edges are cut and planed by cutters controlled by an appropriate cam, and the croze-channel at each end of the staves is cut by an appropriate tool, so that the croze-channels at one end of all the staves shall be the same distance from the center of the bilge of the staves as the croze-channel at the other end is from the said center of the bilge of the staves, and the chamfer is cut, if cut at all, either before or after the staves are set up into barrels.

In Figs. 3 and 4, in a truss-hoop, I', I have shown a complement of my staves made as above described, sufficient in number to form a barrel composed of sixteen staves.

It is necessary that the joint edges of the staves be curved lengthwise of the staves in the manner described, as well as beveled transversely or radially, in order that they may be manufactured from straight rived timber and with concave and convex surfaces which are parallel with each other, and also in order that they may form tight joints when bent into the form of a barrel having a bulge, without the necessity of crushing the fiber of the wood of the staves at their joint edges, as in the case when the joint edges of the staves are beveled longitudinally on a straight line and then bent into the form of a barrel having a bulge.

It is obvious that when these staves are packed it is very advantageous to have them with straight-line surfaces longitudinally, which enables them to lie snugly together and not be liable to change their form; and, further, that there is a necessity for having the joint edges of all the staves formed with curved edges, which, when the staves are bent at different points along their length into circles of gradually-varying diameters in forming a barrel, will exactly meet and match from end to end of the barrel, accordingly as the different diameters of different portions of the barrel require.

What I claim as my invention, and desire to secure by Letters Patent, is—

1. A complement of exteriorly and interiorly planed staves for a bilge tight-joint barrel, all of the staves having the same thickness, and each having an inner transversely-concave and an outer transversely-convex surface, both of gradually-diminishing radii from the center to the ends of the stave, the surfaces being parallel and plane longitudinally, and running with the longitudinal grain of the wood, and having jointed edges beveled radially and curved lengthwise on equal radii centered equidistant from the ends of the stave, substantially as and for the purpose described.

2. The new article of manufacture herein described, consisting of planed unbent staves for bilged tight-joint barrels, every one of a given complement of which staves is made of equal thickness and width, and with an inner surface which is concave and an outer surface which is convex in a transverse direction, the two surfaces being parallel and straight and in a longitudinal direction, and with joint edges which are beveled radially and curved equally on opposite sides of the center of the respective staves, and with a croze-channel at their respective ends equidistant from the center of the bilge of the barrel, substantially as described.

3. The new article of manufacture herein described, consisting of planed unbent staves for bilged tight-joint barrels, every one of a given complement of which staves is made of equal thickness and width, and with an inner surface which is concave and an outer surface which is convex in a transverse direction, the two surfaces being parallel and straight in a longitudinal direction, and with joint edges which are beveled radially and curved equally on opposite sides of the center of the respective staves, and with a croze-channel at their respective ends equidistant from the center of the bilge of the barrel, and with a chamfer at each of their ends, substantially as described.

4. The article of manufacture, to wit: a tight-joint bilged barrel having outwardly-planed bent staves, every one of the staves being of the same thickness and width, and having an inner surface which is transversely concave and an outer surface which is transversely convex, the two surfaces being parallel in a longitudinal direction and running with the grain of the wood, and with joint edges which are beveled radially and curved lengthwise on equal radii centered equidistant from the ends of the stave, and with a croze-channel at their respective ends, equidistant from the center of their length, substantially as described.

ALEXANDER C. BLOUNT.

Witnesses:
H. M. MILLER,
GEO. T. ROBIE.